May 9, 1961 R. TYLER 2,983,101
HYDRAULIC TRANSMISSION WITH LOW SPEED SLIP COMPENSATION
Filed Nov. 3, 1958 2 Sheets-Sheet 1

INVENTOR
RANSOM TYLER
BY
Lloyd LaFave
ATTORNEY

INVENTOR
RANSOM TYLER
BY
Lloyd LaFave
ATTORNEY

United States Patent Office 2,983,101
Patented May 9, 1961

2,983,101

HYDRAULIC TRANSMISSION WITH LOW SPEED SLIP COMPENSATION

Ransom Tyler, Greenfield, Wis., assignor to The Oilgear Company, Milwaukee, Wis., a corporation of Wisconsin Filed Nov. 3, 1958, Ser. No. 771,288
8 Claims. (Cl. 60—53)

This invention relates to a hydraulic transmission and more particularly to an improved speed control for maintaining substantially constant the speed of a hydraulic motor for a transmission when subject to greatly increased loading.

A hydraulic transmission with speed responsive means for maintaining the speed of the hydraulic motor substantially constant, as heretofore provided, was subject particularly at very slow speeds to an excessive dip in speed when the motor was subjected to a relatively heavy load. For a hydraulic motor operated at a low speed within the range of slip for the transmission, a sudden application of a given load thereon normally within the capacity of the system, would cause the hydraulic motor to slow down considerably and sometimes to stall; and a speed responsive control for increasing pump displacement would not prevent such excessive dip in speed and a slow recovery therefrom.

It is therefore an object of the present invention to provide a hydraulic transmission with a hydraulic control system that maintains the speed of the hydraulic motor substantially constant when a relatively heavy load is suddenly applied thereto.

Another object of the invention is to provide a hydraulic transmission system whose output speed is maintained substantially constant upon a sudden relatively severe increase in loading of the motor while operating at a speed within the range of slip of the system.

Another object of the invention is to provide in combination with a closed loop speed control system for varying the stroke of a hydrodynamic machine of a hydraulic transmission, means transmitting pressure fluid to the closed loop system in aid of speed correction upon a suddenly increased load on the transmission.

Other objects and advantages will be apparent upon a reading of the following description taken with the accompanying drawings in which.

Figure 1:
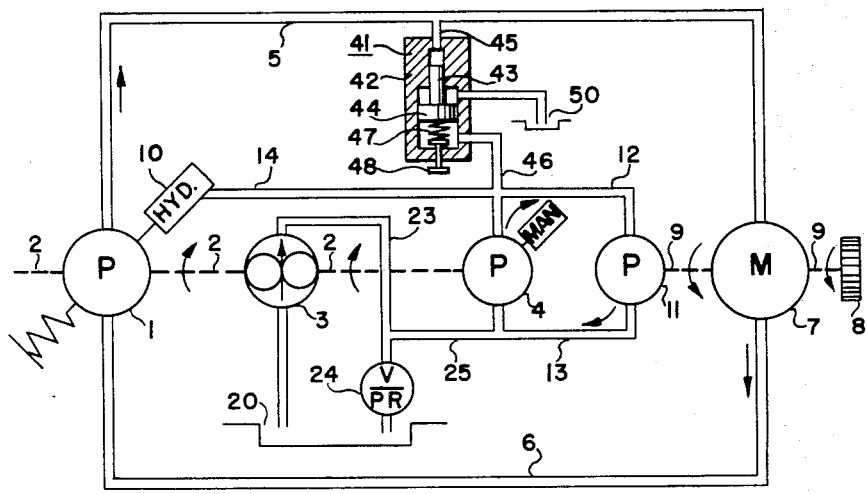
Fig. 1 is a schematic circuit for a hydraulic transmission embodying the present invention.

In the hydraulic transmissions embodying the invention either the hydraulic pump or the hydraulic motor thereof may have a variable displacement member and the other have a fixed displacement. The preferred arrangement is for the pump to have a variable displacement as illustrated in Fig. 1 in which the hydraulic transmission comprises a main pump 1, which is a variable displacement type and supplies motive fluid to a fixed displacement type of hydraulic motor 7.

Pump 1 has a shaft 2 adapted to be driven by a prime mover such as an electric motor, not shown, which also drives a gear pump 3 and a manually controlled variable displacement pilot pump 4.

Pump 1 is connected by channels 5 and 6 to hydraulic motor 7, to supply motive fluid thereto in accordance with the stroke of the pump 1. Pump 1, motor 7 and connecting channels 5 and 6 define a fluid motive power circuit for the transmission.

Coupling means including a gear 8 mounted on a shaft 9 of the hydraulic motor is adapted for driving connection with the load device, not shown.

Control of the speed of movement of the load device is built into the hydraulic transmission and comprises a speed responsive means, such as a hydraulic tachometer comprising a pilot pump 11 mounted on shaft 9 of motor 7 for rotation therewith. Pump 11 is a fixed displacement hydraulic pump connected by channels 12 and 13 is a closed loop hydraulic circuit through a manually adjustable flow control device which preferably is pilot pump 4.

The direction of fluid flow is indicated by arrows Fig. 1, and shows that channel 13 connects the outlet of the load coupled pilot pump 11 to the inlet of the reference pilot pump 4, and channel 12 connects the outlet of the reference pilot pump 4 to the inlet of the load coupled pilot pump. The pilot pump circuit is kept flooded by gear pump 3 whose discharge channel 23 is connected by a branch channel 25 to the channel 13 of the pilot pump circuit.

For the regulation of the stroke of main pump 1, a channel 14 connects channel 12 to the hydraulically operable servo motor 10 mounted on pump 1 for varying pump stroke in response to variations in the pressure developed in channel 12. Pilot pumps 4 and 11 are a hydraulic differential, with pump 11 driven at the speed of motor 7 and pump 4 driven at the speed of the prime mover, which serves as a reference speed, with pump 11 absorbing the output of pump 4, more or less, dependent on the speed of pump 11.

The main power pump 1 has a displacement varying member or slide block 17 shiftable to vary the stroke of the pump. Pump displacement is zero when the slide block is in a neutral position and increases as the slide block moves from its neutral position. A hydraulic servo motor includes in the pump illustrated, a small piston 18 and a large piston 19 in cylinders 21, 22, respectively, on opposite sides of the pump casing 15 with each piston engaging the slide block for moving it in opposite directions in response to control forces applied to the servo motor.

Gear pump 3, which may be included in the same casing 15 with pump 1 draws liquid from reservoir 20 and discharges liquid into channel 23. Channel 23 is connected to cylinder 21 to urge the pump slide block to the right in Fig. 1 with a predetermined force, maintained constant by the control afforded by relief valve 24 operable to bypass gear pump discharge to reservoir to maintain a low pressure in channel 23.

Cylinder 22 of servo motor 10 is connected by a channel 14 to channel 12 so that piston 19 is subject to the control pressure developed by the hydraulic differential of pilot pumps 4 and 11. The axially inner sides of piston 19 and of piston 18 are exposed to the interior of the casing 15 which is suitably connected to reservoir 20.

A load compensator 41 cooperates with the speed control circuit to prevent an excessive drop in motor speed when such speed has otherwise been maintained for a pump discharge pressure below a predetermined value and the sudden application of a load to the hydraulic motor causes the pump discharge pressure to rise above the predetermined value.

The load compensator 41 comprises a cylinder 42 with pistons 43, 44 therein. A channel 45 connects one end of cylinder 42 to channel 5 so that piston 43 is subject to the discharge pressure of main pump 1. A channel 46 connects the other end of cylinder 42 to channel 12 of the pilot pump or speed control circuit and to channel 14 to the pump cylinder 22. Adjustable bias means such as a spring 47 urges pistons 43, 44 toward the channel 5 end of the cylinder. Fluid pressure in channel 12 also acts on piston 44 providing a bias pressure opposing the line pressure acting on opposed piston 43. Since the pressure in channel 12 is normally a predetermined value sufficient to hold the pump slide block in any given position, the spring 47 may be chosen and calibrated to give a wide range of operating pressures to the load compensator. Channel 50 connects the cylinder portion behind piston 44 with drain or return to reservoir 20.

The load compensator 41 operates when pump discharge pressure increases above the preset operating pressure for the load compensator, so that the force produced by pump discharge pressure acting on piston 43 is greater than the bias force provided by the pressure in the control channel 12 acting on piston 44 together with the force of spring 47 acting thereon. Piston 43 forces piston 44 to discharge fluid from the cylinder 42 into channel 12. The force transmitted by the load compensator via the slug of fluid forced into channel 12 is transitory and varies in dependence on the rate of increase of the pressure in channel 5 as such pressure increases from a value below to a value above the predetermined and preset operating pressure for the load compensator.

The load compensator is constructed and arranged so that the maximum slug of fluid discharged thereby for a maximum rate of change in pump discharge pressure will be effective to increase the stroke of the pump by an amount more or less and preferably equivalent to the range of slip or fluid leakage of the system.

Utilizing the hydraulic transmission for driving a load device such as a centrifuge machine at a low critical plowing speed, the hydraulic motor may be operating at a speed of 50 r.p.m. and will require a supply pressure of about 100 p.s.i. for free spinning the centrifuge and 1200 p.s.i. for driving the centrifuge when its plow is applied for loosening centrifuged material from a wall of the centrifuge.

Upon application of the plowing load, the pump discharge pressure rises very rapidly as the motor tends to slow down and to stall. Upon discharge pressure increasing above the preset value, say 300 p.s.i., for the load compensator, for a rapid rate of increase in pressure of pump 1, the load compensator transmits a slug of fluid to channel 12 and thereby to control cylinder 22 to change the stroke of the pump by 6%, equivalent to the range of slip of the system, and thereby effectively maintains the speed of the hydraulic motor at 50 r.p.m. in anticipation of the corrective action that would be produced by the speed control circuit. The load compensator not only anticipates the corrective action of the speed responsive means but assists such means in its operation in overcoming the friction of parts and inertia of the system.

The load compensator of Fig. 1 remains in discharged position as long as the discharge pressure of pump 1 remains above its preset operating value, 300 p.s.i. in the example described, and the pistons return to biased position shown in Fig. 1 when pump discharge pressure falls below the preset value.

Figure 3:
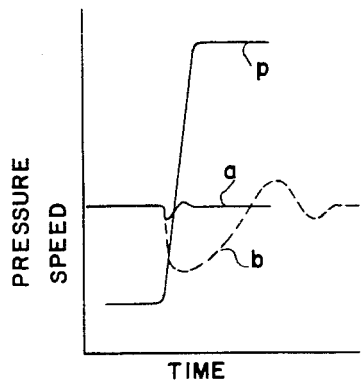
Figs. 3 and 4 are illustrative speed and pressure curves for the hydraulic motor of Fig. 1 for the condition of a suddenly applied heavy load.
Figure 4:
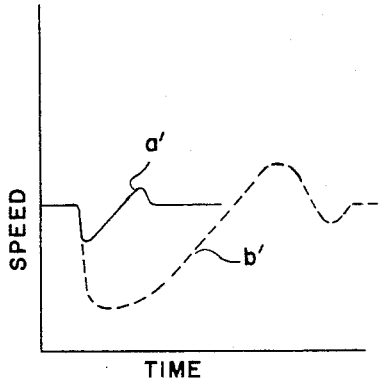

Figs. 3 and 4 of the drawing show curves of the change in speed of the hydraulic motor plotted against time upon the application of different suddenly applied loads that increase pump pressure in channel 5 from a value below to a value above the operating pressure for the load compensator. Curves $b$ and $b^1$ show the speed change and the time of speed recovery to be excessive for a speed controlled circuit not utilizing a load compensator rate of change correction; whereas, curves $a$ and $a^1$ show the speed change to be small and tolerable and the time of recovery also very small for the combination of speed control with the load compensator. Fig. 3 also shows the rate of change of pump discharge pressure for the speed curves illustrated.

Figure 5:
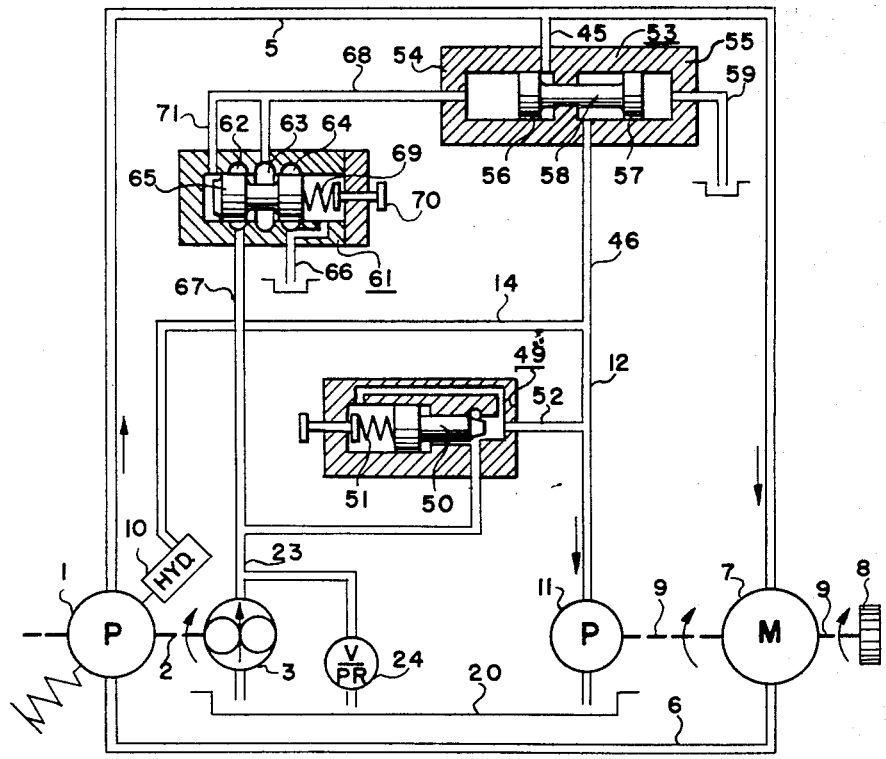
Fig. 5 is a schematic circuit of another hydraulic transmission embodying the present invention.

Fig. 5 shows a modification of the hydraulic transmission of Fig. 1. In Fig. 5 the hydraulic differential of the speed responsive circuit is provided by an output of gear pump 3 supplying fluid to channel 12 at a constant rate. An adjustable flow control valve 49 that is pressure compensated, is connected to channel 23 to receive gear pump fluid. A channel 52 connects the discharge of valve 49 to channel 12 which is connected to the inlet of pilot pump 11. Valve member 50 of the flow control valve is urged to open position by the fluid pressure at the ionlet of valve 49. The fluid pressure at the discharge of valve 49, inlet pressure less drop across the orifice of the valve, is transmitted through a duct to the opposite end of valve 49 to urge the valve member to closed position aided by an adjustably tensioned spring 51. Channel 14 connects channel 12 to the control cylinder 22 of the servo mechanism 10, Figs. 2 and 5.

Fig. 5 shows that a different load compensator than that of Fig. 1 may be employed. This load compensator 53 comprises a pair of cylinders 54, 55 having pistons 56, 57 respectively, interconnected by a rod 58. Pump discharge pressure in channel 5 is connected to cylinder 54 so that pressure therein acts on the smaller area of piston 56 to urge it toward the left. Piston 57 which moves with piston 56, when pulled to the left discharges fluid from cylinder 55 into channel 46 and channel 12 of the control circuit. The end of cylinder 57 on the other side of piston 57 is connected by a channel 59 to drain.

Piston 56 is biased toward the right primarily by pressure supplied from the gear pump 3 through a suitable adjustable pressure regulating valve 61, which supplies a selected constant pressure to bias the load compensator so that it is operative upon pump discharge pressure increasing above said selected predetermined pressure. The load compensator transmits a slug of pressure fluid, as its pistons are displaced to the control circuit to vary the stroke of pump 1 in anticipation and in aid of the corrective action required of the speed responsive means provided by the hydraulic differential.

Valve 61 comprises a body having a bore containing a valve member 65 with two spaced apart lands generally positioned adjacent outer annular grooves 64, 62 which are connected respectively, by a channel 66 to drain and by a channel 67 to the outlet of the gear pump 3. An intermediate annular groove 63 is connected by a channel 68 to an end of cylinder 54 of the load compensator to supply pressure thereto for acting on the larger area of piston 56.

Adjustable bias means such as a spring 69 acts on an end of valve member 65 urging it in one direction. A channel 71 connects channel 68 to the opposite end of the valve body to supply fluid pressure thereto in opposition to spring 69, such that when the pressure overcomes the spring, the valve blocks passage of fluid between grooves 63 and 64, and further movement opens groove 63 to drain groove 64. Contra, spring 69 in moving valve member 65 to the left blocks drain groove 64 and opens pressure supply groove 62 to groove 63 to supply gear pump fluid to the load compensator.

Figure 2:
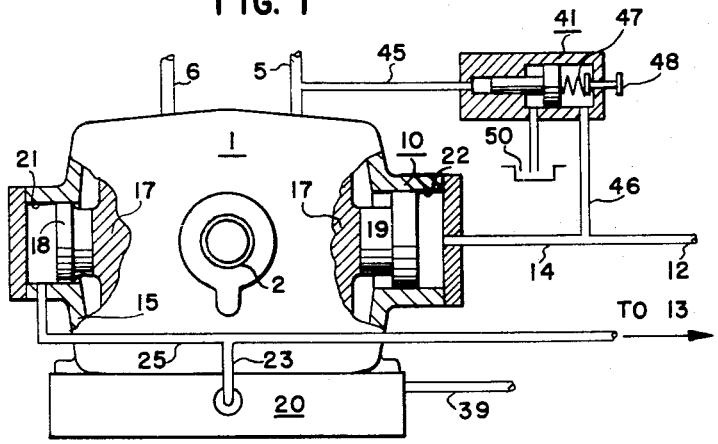
Fig. 2 is an end view of the main pump of Fig. 1 showing the control portion thereof in cross section.
Figure 6:
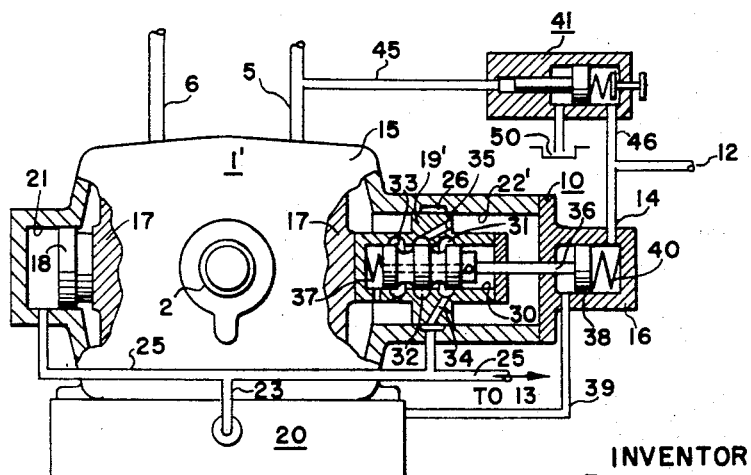
Fig. 6 is an end view of another main pump that may be used in Fig. 1 and showing the control portion thereof.

Fig. 6 shows another main pump $1^1$ that may be used in the circuit of Fig. 1 and differs from the pump 1 of Fig. 2 primarily in its control mechanism. Gear pump 3, which may be included in the same casing 15 with pump $1^1$, draws liquid from a reservoir 20 and discharges the liquid into a channel 23 connected to both cylinders 21, $22^1$. A relief valve 24 connected to channel 23 is operable to bypass the gear pump to the reservoir for maintaining a relatively low pressure in channel 23.

Cylinder 22¹ has a follow up type of valve and piston combination disposed therein. Cylinder 22¹ has an annular groove 26 open to channel 25. Piston 19¹ is provided with an axial bore 30 having three annular grooves or ports 31, 32 and 33. Port 31 communicates through a duct with 34 with groove 26. Port 32 communicates through a duct 35 with the outer portion of cylinder 22¹. Port 33 is connected to drain by a duct open to the inner end of cylinder 22¹ and to the interior of the casing.

A pilot valve 36 controls communication between port 32 and ports 31 and 33. Pilot valve 36 has three spaced apart lands formed thereon and is fitted in piston bore 30. The arrangement is such that a very slight movement of valve 36 to the left will admit gear pump liquid through duct 34, ports 31 and 32 and duct 35 into cylinder 22¹ and move piston 19¹ and slide block 17 toward the left. Movement of piston 19¹ toward the left relative to the valve will close the ports therein, so that as soon as valve 36 ceases to move, the lands will close the ports and the piston will cease to move. Movement of the piston 19 and slide block 17 toward the left increases pump displacement and causes opposite piston 18 to eject fluid from cylinder 21. And, contra, pump 1 displacement is decreased by a slight movement of the pilot valve toward the right which opens port 32 to exhaust port 33 so that liquid can escape from cylinder 22.

Pilot valve 36 is urged to the right by a spring 37 and holds the stem of the valve against a small control piston 38 in control cylinder 16. A weak spring 40 in control cylinder 16 urges piston 38 against the stem of the pilot valve.

A channel 14, as shown on Figs. 1 and 2 connects the control cylinders to the pilot pump circuit so that fluid under pressure therein acts on control piston 38 in a direction tending to move pilot valve 36 against its spring 37 for increasing the pump stroke in accordance with the pressure transmitted from the speed control circuit of the pilot pumps 4 and 11.

A channel 39 connects the opposite or stem end of the control cylinder to the reservoir.

Load compensator 41 cooperates in the same manner heretofore described with the speed control circuit to prevent an excessive drop in the speed of motor 7 when such speed has otherwise been maintained for a pump discharge pressure below a predetermined value and the sudden application of a load to the hydraulic motor causes the pump discharge pressure to rise above the predetermined value.

While but few embodiments of the present invention have been shown and described it will be obvious to one skilled in the art that changes and modifications may be made therein without departing from the spirit of the invention or from the scope of the appended claims.

I claim:

1. In combination, a variable displacement hydrodynamic machine adapted for use in a hydraulic transmission including a fluid operated main motor and including a control hydraulic servo motor to vary the displacement of said machine in accordance with the rate of flow of fluid through said main motor, and a cylinder connected between a pressure port of said machine and said servomotor, piston means disposed in said cylinder and urged by a bias force toward the end thereof connected to said port, said piston means actuated by a predetermined pressure in said port to discharge a slug of fluid from said cylinder into said servomotor and actuate said servomotor in a direction anticipating corrective action for increasing the displacement of the machine.

2. In combination with a variable displacement pump supplying motive fluid to a hydraulic motor, of hydraulic servo means including a control cylinder for varying pump displacement in accordance with the rate of flow of said fluid through said motor, and a cylinder containing a piston hydraulically connected between a discharge port of said pump and said control cylinder and operable upon increase of pump pressure to a predetermined value to transmit a slug of pressure fluid to said control cylinder for increasing pump displacement for holding the speed of said motor constant.

3. In a closed loop speed control system comprising a hydraulic pump and a hydraulic motor connected by fluid supply lines to form a hydraulic transmission adapted to drive a machine at speeds including a relatively slow speed within the slip speed range for said transmission, said hydraulic pump having a displacement varying member and servomotor means for shifting said member and thereby varying the speed of said machine, a source of pressure liquid, means connecting said source to said servomotor including a pilot valve operative to control the flow of liquid to and from said servomotor, and control means responsive to variations in the speed of said hydraulic motor to vary the position of said pilot valve for maintaining the speed of said hydraulic motor constant, and hydraulic means responsive at a predetermined pressure to an increase in load on said hydraulic motor when operating at said predetermined slow speed for adding a slug of pressure fluid to said pilot valve to position the valve member thereof for increasing the stroke of the pump in anticipation of the corrective action of said speed responsive control means.

4. In a closed loop speed control system for a hydraulic transmission adapted to drive a machine at a speed within the slip speed range of said transmission, the combination comprising a hydraulic pump, a hydraulic motor, fluid supply lines connecting said pump to said motor, said pump having a displacement varying member and servomotor means for shifting said member to vary the stroke of the pump and thereby vary the speed of the machine, a source of pressure liquid, a pilot valve operative to control the flow of pressure liquid from said source to said servomotor and means responsive to the speed of said hydraulic motor to regulate the position of said pilot valve for maintaining said speed of said machine constant, and a load compensator comprising a cylinder and a spring loaded piston hydraulically connected between one of said supply lines and said servomotor and operative upon an increase in pressure in said line above a predetermined value so that the piston therein transfers a slug of fluid to said servomotor to change the stroke of said pump in anticipation of the corrective action of said control means.

5. In combination with a variable displacement pump supplying motive fluid to a hydraulic motor, of hydraulic servo control means for varying the stroke of the pump in accordance with the pressure of a hydraulic differential speed control circuit including a pilot pump driven by the hydraulic motor and hydraulically connected in series with a controlled flow reference supply including a supply pump, a cylinder connected between a discharge port of said supply pump and an inlet port of said pilot pump, and a piston in said cylinder biased in one direction by a predetermined constant pressure and acted upon in an opposite direction by the discharge pressure of said variable displacement pump to cause said piston to transmit a slug of fluid into said differential speed control circuit to initiate corrective action by said servo motor in anticipation of a change in pressure in said circuit.

6. A hydraulic pump having a member shiftable under fluid pressure to vary the displacement thereof and the stroke of the pump, pilot valve means for controlling said shiftable member in response to the speed of a load hydraulic motor supplied with fluid by said pump, a cylinder connected between a discharge port of said pump and said pilot valve, a piston in said cylinder biased in one direction and movable in the opposite direction by pump discharge pressure, as said pressure exceeds a predetermined value, to transmit a slug of pressure fluid to said pilot valve for increasing pump displacement.

7. In combination, a variable displacement hydrodynamic machine adapted for use in a hydraulic transmission including a fluid operated load motor and including a main hydraulic servomotor to vary the displacement of said machine, a follow up type of valve controlling the supply of a pressure fluid to and from said main servomotor, a control servomotor for moving a valve member of said follow up type of valve in accordance with the rate of flow of fluid through said load motor, and a cylinder connected between a pressure port of said machine and said control servomotor, a piston disposed in said cylinder and urged by a bias force toward the end thereof connected to said port, said piston actuated by a predetermined pressure in said port to discharge a slug of fluid from said cylinder into said control servomotor to actuate said servomotor in a direction for varying the displacement of the machine in a direction opposing a change in said rate of flow.

8. A hydraulic transmission comprising a first machine operable as a pump and a second machine operable as a load driving motor and receiving motive fluid from said pump, said transmission including a servomotor controlled to vary the displacement of one of said machines in accordance with the rate of flow of fluid in said load driving motor in combination with a load compensator comprising a cylinder connected between a pressure line of said transmission and said servomotor, said cylinder having a piston urged by a bias force to oppose the pressure of said line and operable only as said pressure exceeds a predetermined value to transmit a slug of fluid to said servomotor for increasing the displacement of said one of said machines in order to hold the speed of said motor constant.

References Cited in the file of this patent

UNITED STATES PATENTS

| | | |
|---|---|---|
| 2,238,063 | Kendrick | Apr. 15, 1941 |
| 2,389,830 | Tyler | Nov. 27, 1945 |
| 2,571,480 | Patterson | Oct. 16, 1951 |